Nov. 13, 1923.
F. W. HUBER
1,473,990
CEMENT MIXER
Filed April 3, 1923
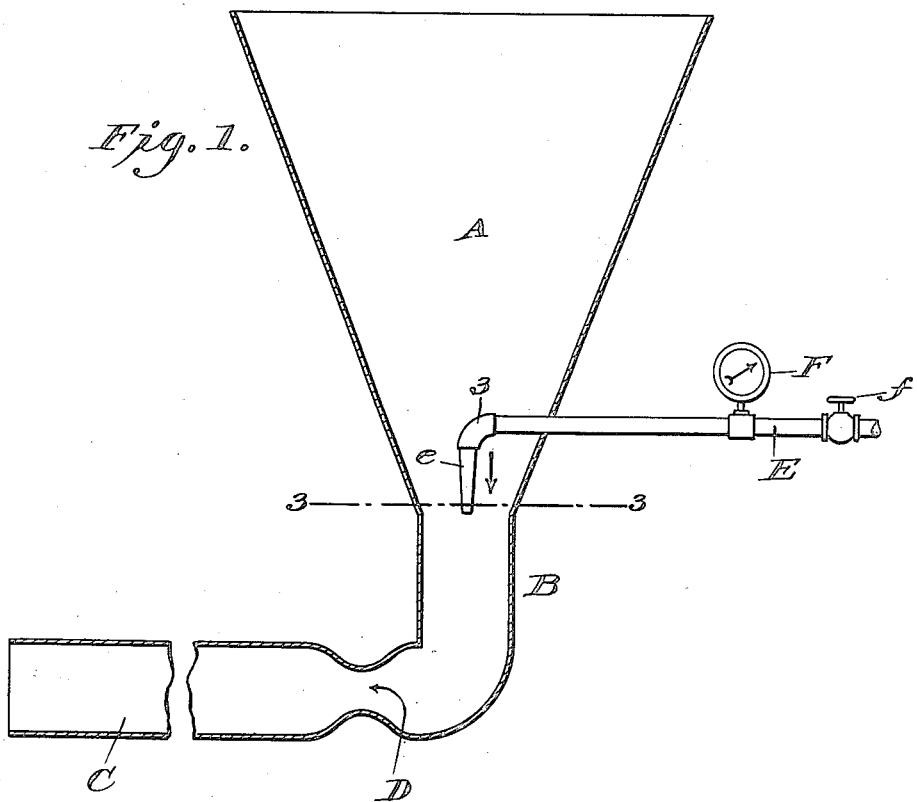
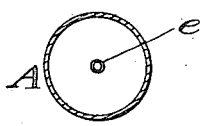
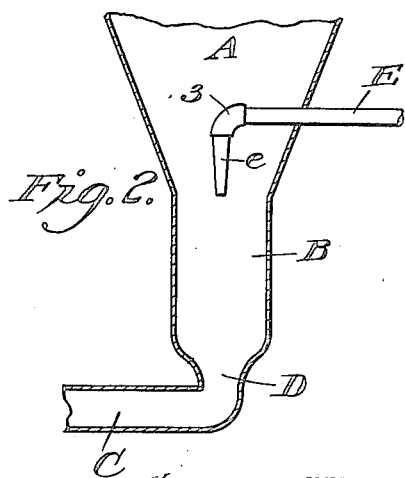
INVENTOR,
Frederick W. Huber;
BY
ATTORNEYS.

Patented Nov. 13, 1923.

1,473,990

UNITED STATES PATENT OFFICE.

FREDERICK W. HUBER, OF RIVERSIDE, CALIFORNIA.

CEMENT MIXER.

Application filed April 3, 1923. Serial No. 629,603.

*To all whom it may concern:*

Be it known that I, FREDERICK W. HUBER, a citizen of the United States, residing at Riverside, in the county of Riverside and State of California, have invented new and useful Improvements in Cement Mixers, of which the following is a specification.

This invention relates to cement mixers or mixers for making Portland cement grouts, and it has for its object to provide improvements of this character which will be superior in point of relative simplicity and inexpensiveness of construction, taken conjointly with positiveness and effectiveness and efficiency and speed in operation, facility in control and general serviceability. Such mixtures or grouts, as above referred to, are usually prepared by mixing the cement and aqueous fluid in large pans or boxes by means of a pressure hose, the mixture being stirred by hand, or by some mechanical mixer with paddles. The first named method is the most reliable, but both methods are relatively slow and require the work of a number of laborers. The present apparatus dispenses with much labor and produces a satisfactorily mixed product.

With the above and other objects in view, the invention consists in the novel and useful provision, formation, construction, combination, association and relative arrangement of parts, members and features, all as hereinafter described, shown in the drawing, and finally pointed out in claims.

In the drawing:

Figure 1 is a fragmentary central vertical sectional view of the principal features of a cement or grout mixer constructed in accordance with the invention;

Figure 2 is a similar view of a modified form of construction; and,

Figure 3 is a detail transverse sectional view upon the line 3—3 of Figure 1.

Corresponding parts in all the figures are designated by the same reference characters.

Referring with particularity to the drawing, I have shown at A a hopper in the form of an inverted truncated cone, the smaller or discharge end of which communicates with a cylindrical mixing chamber B which communicates with an outlet nipple, pipe or spout C, there being a zone D of constriction between the mixing chamber B and the outlet conduit C. The forms of construction in Figures 1 and 2 are the same, with the exception that the zone of constriction in Figure 1 is laterally of the mixing chamber B, whereas in Figure 2 it is beneath such mixing chamber. The object of providing the zone of constriction D, whether at one side of or beneath the mixing chamber B, is to produce a more effective mixing action or final mixing action, or commingling of the fluid and cement, by somewhat restricting or obstructing the flow of the grout out of the mixing chamber B. In each form of construction, the fluid is introduced at the top of the mixing chamber B, through a pipe E having a pressure gauge F whereby the amount of fluid delivered per time unit may be determined, and regulation of the supply of such fluid may be had through a suitable globe valve or other cock or valve device *f*, the fluid being supplied to and through the pipe, through a suitable pump or by other agency, or from a suitable source of supply. The fluid so introduced may be water or other aqueous liquid not injurious to the cement. The nozzle *e* of the pipe E is preferably disposed centrally of the top of the mixing chamber so that its discharge orifice is arranged substantially at the junction of the hopper and the mixing chamber, such nozzle, in the use of a truncated conical hopper, extending approximately within the longitudinal axis thereof, whereby the in-flowing fluid is directed into the mixing chamber in the same direction of flow as pursued by, and within the mass of, the cement supplied to the hopper A, by emptying bags of cement into such hopper or otherwise. In practice I aim to keep the hopper practically full of dry cement throughout the mixing operation. The pipe E may be led into the hopper through the side thereof, and the nozzle, of any desired or preferred form, joined to the pipe E by an elbow or unions, or the pipe E may be simply bent and reduced to form the nozzle, all within preference. In the action and operation of the mixer, the cement flows by gravity downwardly into the mixing chamber conjointly with the fluid emitted from the nozzle *e*. I call attention to the advisability of having the axis of the nozzle *e* practically coincident with the vertical axis of the mixing receptacle, as otherwise the stream of water will produce cross-eddies and will not give a complete mixture, nor a uniform grout.

Also if the nozzle is placed at a considerable distance from the center, the device will not mix nearly as much grout, per unit of time. The mix then passes through the discharge conduit, such as the nipple or pipe C, to the point of use or temporary storage. The mix produced as above described is found to be superior in its evenness and smoothness of quality. The consistency of the grout will be governed by the relative proportions of cement and aqueous liquid in the grout, and these proportions are in turn governed, for any particular machine, by the speed with which the stream of water or other liquid is introduced through the nozzle e.

The constriction shown at D, as will be understood, causes more or less resistance of flow out from the mixing chamber, and hence causes the grout to remain in the mixing chamber sufficiently long to produce a very complete mixing of the cement and aqueous liquid.

The strong stream of water or other liquid projected through the nozzle e, violently cuts and churns the cement in the mixing chamber, thereby very rapidly producing a very uniform and homogeneous grout, which flows away through the outlet conduit C, while the constriction D prevents a too rapid flow, so as to allow sufficient time for a complete mixing.

By directing the fluid into the mixing chamber in the same direction of flow as pursued by the cement entering such chamber from the hopper A, it is found that a more effective and speedy commingling of the cement and fluid occurs than when the cement and fluid are mixed by hand, or some sort of a mechanical mixer is utilized.

The invention in certain particulars and aspects provides a new method of cement mixing, as hereinafter claimed.

The direction of the mix laterally from the mixing chamber B, of course impedes the flow of the mix and materials thereof lengthwise of or downwardly through the mixing chamber, thus causing a retardation of flow in that direction, which promotes the mixing action.

It is obvious that changes and modifications may be made in practicing the invention, in departure from the particular features hereinabove described and shown in the drawing, without departing from the spirit of the invention.

Having thus disclosed my invention, I claim and desire to secure by Letters Patent:

1. A mixing device comprising an upright substantially cylindrical mixing chamber, a lateral outlet conduit having therein a constricted zone, means for introducing a jet of liquid at high velocity into said upright mixing chamber, such introduction being in the direction of flow of the mass at the point of such introduction, means for delivering solid pulverulent material directly into said mixing chamber.

2. An improved mixer of the character disclosed, comprising an upright mixing chamber provided with a feed hopper, means being provided for introducing fluid to the mixing chamber in the same direction of flow as pursued by the material supplied to the mixing chamber from the hopper; said means comprising a supply pipe entering the hopper laterally and provided with a nozzle in angular relation to such pipe and lying substantially in the longitudinal axis of the hopper; said mixing chamber being provided with an outlet, there being a zone of constriction between such outlet and the mixing chamber; said outlet being laterally of the mixing chamber, and a discharge pipe in communication with said outlet; said discharge pipe being substantially of the same cross sectional area as the mixing chamber.

3. A cement grout mixer comprising an upright substantially cylindrical mixing chamber, a nozzle projecting downwardly into the upper end of said mixing chamber, a hopper surmounting said mixing chamber and opening directly thereinto, a lateral outlet conduit connected to the bottom of said mixing chamber, said conduit having a constricted zone therein.

4. A cement grout mixer comprising an upright substantially cylindrical mixing chamber, a nozzle projecting downwardly into the upper end of said mixing chamber, the axis of the said nozzle and the axis of said chamber being substantially coincident, a hopper mounted upon and opening directly into said chamber, and a lateral outlet conduit connected to the bottom of said mixing chamber, such conduit having a constricted zone therein.

5. In a mixing device for producing cement grout, a substantially cylindrical mixing receptacle, means for introducing dry cement in a downward direction into the said cylindrical receptacle, a downwardly directed nozzle leading into said cylindrical receptacle, a substantially horizontal outlet conduit leading from the lower part of said cylindrical receptacle, such conduit having a constricted zone therein.

6. In a mixing device for producing cement grout, a substantially cylindrical mixing receptacle, means for introducing dry cement in a downward direction into the said cylindrical receptacle, a downwardly directed nozzle leading into said cylindrical receptacle, the axis of the nozzle being coincident with the axis of the mixing receptacle, a substantially horizontal outlet conduit leading from the lower part of said cylindrical receptacle, such conduit having a constricted zone therein.

7. In a mixing device for producing cement grout, a substantially cylindrical mixing receptacle having a vertical axis, means for continuously introducing dry cement by gravity, into said receptacle, a downwardly directed nozzle leading into said cylindrical receptacle and terminating at near the top of said receptacle at about the middle of the cross-sectional area thereof, a substantially horizontal outlet conduit leading away from the lower part of said cylindrical receptacle, said conduit having a constriction therein.

8. In a mixing device for producing cement grout, a feed hopper, a substantially cylindrical mixing receptacle located directly below the same, a nozzle projecting downwardly into the top of said mixing receptacle at about the middle of said top, the whole of the cross-sectional area of the bottom of said mixing receptacle being connected with a lateral outlet conduit having a diameter substantially less than that of the mixing chamber.

9. In a mixing device for producing cement grout, a feed hopper, a substantially cylindrical mixing receptacle, located directly below the same, and connected thereto, a nozzle projecting downwardly into the top of said mixing receptacle at about the middle of said top, the whole of the cross-sectional area of the bottom of said mixing receptacle being connected with a lateral outlet conduit having a constriction therein, said receptacle having an unobstructed passage-way.

10. A mixer for producing fluid cement grout, including a feed hopper, a substantially cylindrical mixing chamber mounted below the same and adapted to receive dry cement therefrom, said chamber being wholly unobstructed interiorly, a downwardly projecting nozzle substantially concentric with said mixing chamber and terminating at near the upper end of said mixing chamber, and means for supplying liquid under pressure to said nozzle.

11. A mixer for producing fluid cement grout, including a feed hopper, a substantially cylindrical chamber mounted below the same and adapted to receive dry cement therefrom, a free unobstructed opening being provided from said hopper into said mixing chamber, a downwardly projecting nozzle substantially concentric with said mixing chamber and terminating at near the upper end of said mixing chamber, and means for supplying liquid under pressure to said nozzle, an outlet conduit leading from said mixing chamber having a portion thereof adapted to impede the efflux of said grout through the same.

12. A method of forming a cement grout which comprises continuously supplying dry cement in a downward direction by gravity, into a mixing chamber free from standing water; simultaneously and continuously directing a strong jet of liquid under pressure in a downward direction centrally into the mass of said dry cement in said mixing chamber, whereby the liquid and cement are mixed with each other, continuously allowing the exit of the cement grout from the lower part of the mixing chamber, while somewhat obstructing the flow of the grout therefrom, whereby the mixture is held in the mixing chamber sufficiently long to produce a thorough and uniform mixture; all of the liquid introduced being supplied by such downwardly directed jet of liquid, and all of the agitation being produced by such downwardly directed jet of liquid.

In testimony whereof, I have signed my name to this specification in the presence of two subscribing witnesses.

FREDERICK W. HUBER.

Witnesses:
W. T. HENDERSON,
I. S. LOGAN.